(12) United States Patent
Walker

(10) Patent No.: US 6,471,272 B1
(45) Date of Patent: Oct. 29, 2002

(54) FOREARM-MOUNTED TROWEL ASSEMBLY

(76) Inventor: Thomas N. Walker, 1841 Roxbury Rd., Columbus, OH (US) 43212

( * ) Notice: Subject to any disclaimer, the term of this patent is extended or adjusted under 35 U.S.C. 154(b) by 0 days.

(21) Appl. No.: 09/375,152

(22) Filed: Aug. 16, 1999

(51) Int. Cl.[7] .................................................. A01B 1/22
(52) U.S. Cl. ............................................. 294/57; 294/25
(58) Field of Search ............................... 294/25, 26, 49, 294/50.6, 51, 55, 57, 58; 16/422, 426, 427, 429, 430; 30/298; 56/400.01, 400.04; 172/371, 372, 378; 224/218, 219, 222

(56) References Cited

U.S. PATENT DOCUMENTS

| | | | |
|---|---|---|---|
| 309,437 A | * 12/1884 | Calef ........................ 294/58 X |
| 3,981,526 A | * 9/1976 | Lundqvist ...................... 294/25 |
| 4,157,616 A | * 6/1979 | Lundqvist .................. 294/25 X |
| D339,966 S | * 10/1993 | Burnett ...................... 294/57 X |
| 5,890,259 A | * 4/1999 | Sarac ........................ 294/25 X |
| 5,937,627 A | * 8/1999 | McKittrick ................ 294/25 X |

FOREIGN PATENT DOCUMENTS

GB 2298158 * 8/1996 .................. 294/25

* cited by examiner

Primary Examiner—Johnny D. Cherry
(74) Attorney, Agent, or Firm—Wm. Cates Rambo

(57) ABSTRACT

A forearm-mounted trowel assembly including a trowel blade, a brace adapted to extend laterally from an upper portion of the blade, a handle affixed to the blade with a graspable portion spaced a distance from the brace sufficient to enable a user's hand to move within the handle without inadvertently slipping out, and a band mounted on the brace a distance from the handle for attachment to the user's arm.

14 Claims, 2 Drawing Sheets

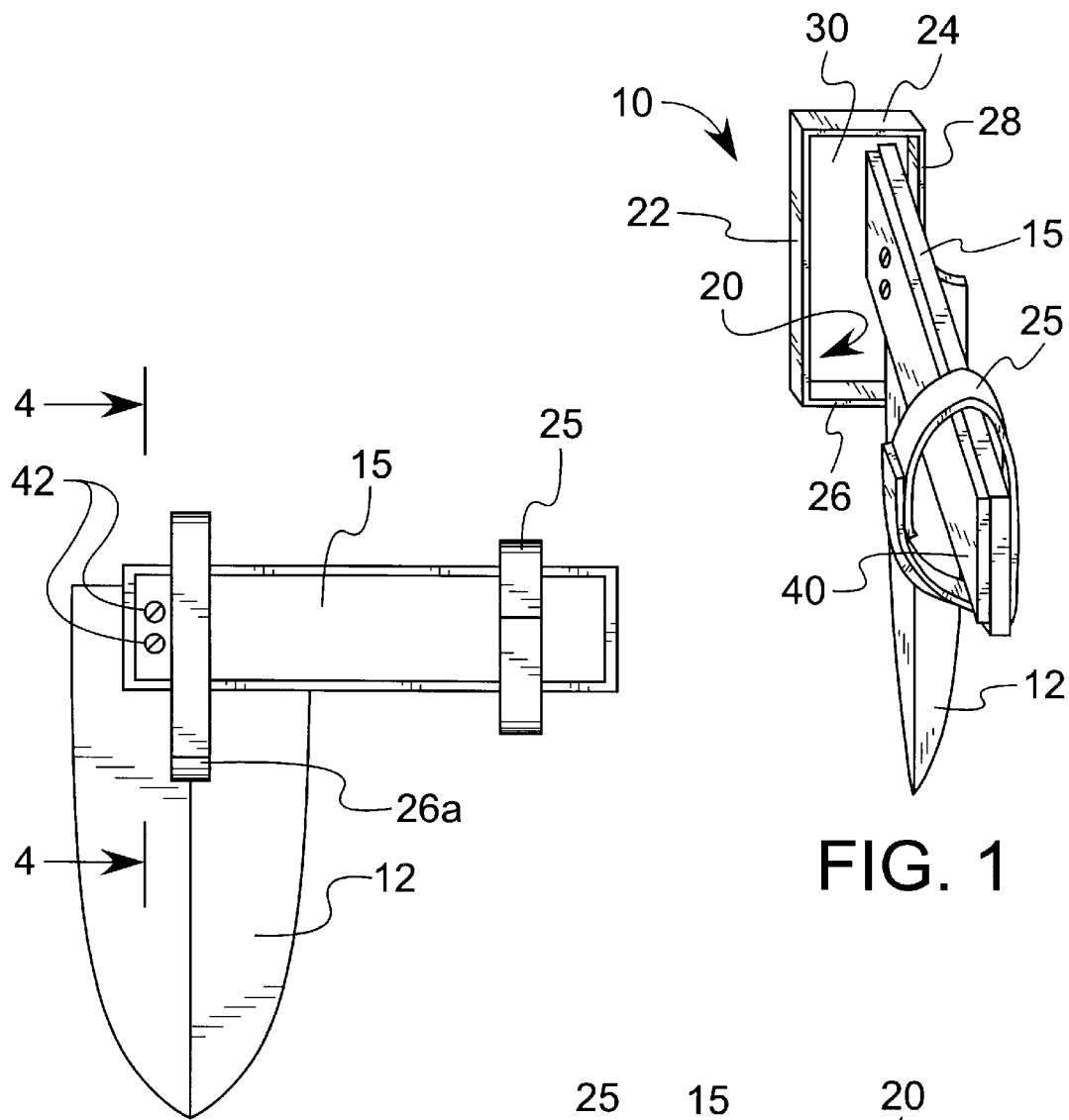
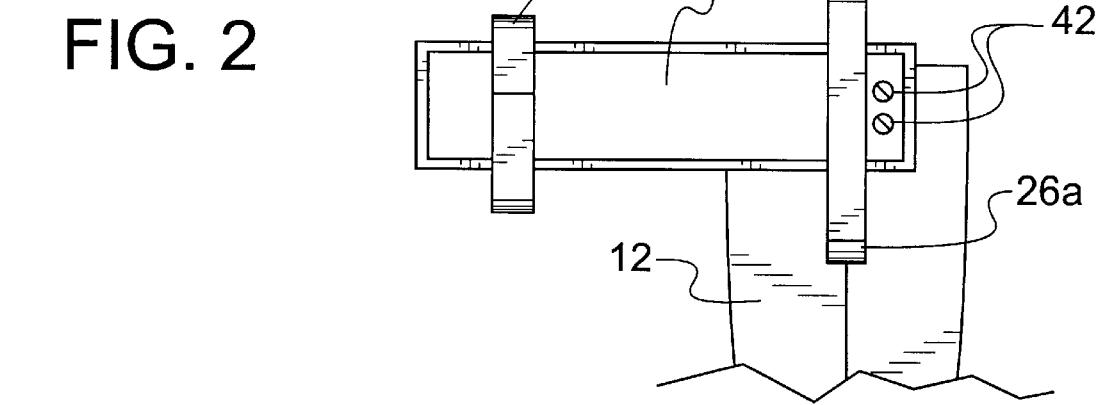

FOREARM-MOUNTED TROWEL ASSEMBLY

BACKGROUND OF THE INVENTION

This application relates generally to a gardening tool and more particularly to a trowel adapted for attachment to the user's forearm. A conventional trowel typically has a handle opposite the trowel blade for a user to grip in order to exert force on the blade for digging up soil. It is the inventor's belief that this arrangement places undue stress on the user's hand and wrist, and repeated cycles of digging and planting with a conventional trowel commonly result in a sore wrist and forearm. In addition, gardening with a conventional trowel requires that the user set the tool down in order to pick up and plant flowers or plants or to dispose of weeds. When the trowel is placed on the ground, it is easily lost or left behind when the user moves to a different location. This can be a source of aggravation and frustration, especially when the user has moved out of reach of the trowel.

SUMMARY OF THE INVENTION

The present hand-operated trowel assembly is adapted for mounting on the user's forearm and basically comprises a trowel blade, a brace adapted to extend outwardly from an upper portion of the blade, a handle having a graspable portion disposed in spaced relation and generally perpendicularly to the brace, and a forearm-engaging band mounted on the brace in spaced relation to the handle.

It is an objective of the present invention to provide a trowel that remains attached to the user even when not in immediate use, thereby eliminating the need to set the trowel down for planting and pick it back up for digging, in repeating and often aggravating cycles of gardening.

It is another objective of this invention to provide a trowel that distributes the force exerted on the blade by the user through a combination of a handle, brace, and arm band, thereby placing less stress on the user's hand and wrist.

These and further objects of the invention will become apparent from the following detailed description.

BRIEF DESCRIPTION OF THE DRAWINGS

FIG. 1 is a perspective view of a preferred embodiment of the trowel assembly described herein.

FIG. 2 is a front elevational view of the trowel assembly of FIG. 1.

FIG. 3 is a fragmentary front elevational view of another embodiment of the trowel assembly of FIG. 1.

DESCRIPTION OF THE PREFERRED EMBODIMENT(S)

Figure 4:
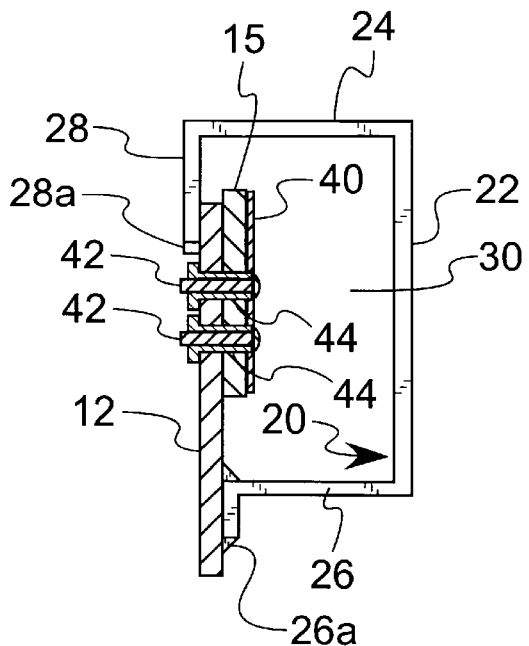
FIG. 4 is a fragmentary vertical sectional view taken along line 4—4 of FIG. 2 and particularly illustrates the upper portions of the present trowel assembly.

As illustrated in FIG. 1, the present trowel assembly, generally designated 10, basically comprises a trowel blade 12, a longitudinally extending brace 15 adapted to extend laterally outwardly from an upper portion of the blade 12 at approximately a ninety degree (90°) angle to the blade 12, a handle 20 mounted on the trowel blade 12 and having an elongated graspable portion 22 disposed in spaced relation and generally perpendicularly to a long axis of the brace 15, and a forearm-engaging band 25 mounted on the brace 15 in laterally outwardly spaced relation to the handle 20. The trowel blade 12 extends downwardly from the brace 15 and is preferably mountable on the brace 15 with a concave face of the trowel blade facing outwardly from a side of the brace 15 opposite the graspable portion 22 of the handle 20. A forearm-cushioning elastomeric pad 40 is mounted on the same side of the brace as the graspable portion 22 of the handle.

As illustrated in FIGS. 2–4, one end of the brace 15 is removably secured to the upper portion of the blade 12 by nuts and bolts 42. Fastener-receiving openings 44 for receiving nuts and bolts 42 are provided at the end of the brace 15 opposite the band 25 so that the brace 15 may be selectively attached to the trowel blade 12 to extend laterally from the blade 12 in either of two opposite directions. With the brace 15 extending in one direction from the blade 12, the present trowel assembly is adapted to receive the user's right hand and forearm (FIG. 2), and with the brace 15 extending in the opposite or a second direction from the blade 12, the present trowel assembly is adapted to receive the user's left hand and forearm (FIG. 3).

As illustrated in FIG. 4, the handle 20 is generally U-shaped or block-O shaped and has an upper leg 24 and lower leg 26 extending generally perpendicularly to the upper and lower ends, respectively, of the graspable portion 22. A return portion 28 extends downwardly from the upper leg 24. As shown in FIGS. 2–4, the lower leg 26 is provided with a flange 26a which is welded or otherwise secured to a convex surface of the blade 12. Preferably, an end of the return portion 28 opposite the upper leg 24 is welded to the upper portion of the trowel blade 12, as shown in FIG. 4. As described below, the graspable portion 22, upper leg 24, lower leg 26, and return portion 28 of the handle 20 define a hand-receiving space 30 into (and out of) which a user's hand is freely movable. The graspable portion 22 of the handle 20 may be provided with grooves or indents to aid the user in gripping the handle.

Figure 5:
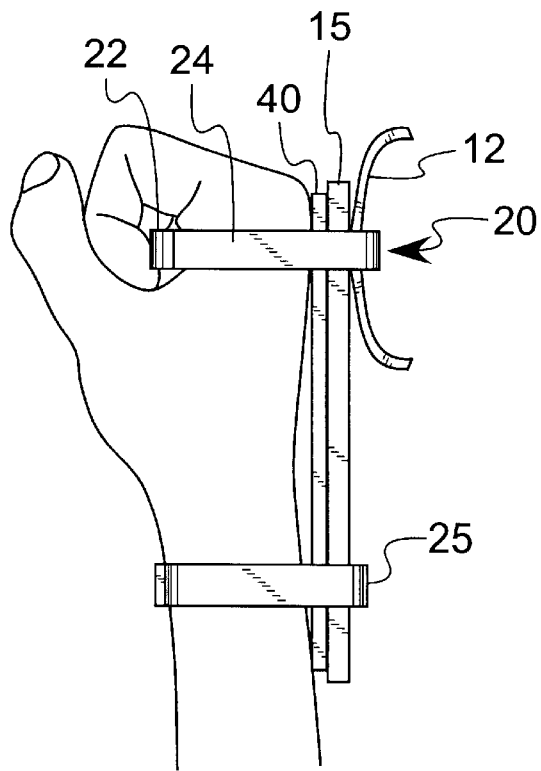
FIG. 5 is a top plan view of the present trowel assembly showing the user's hand grasping the handle.
Figure 6:
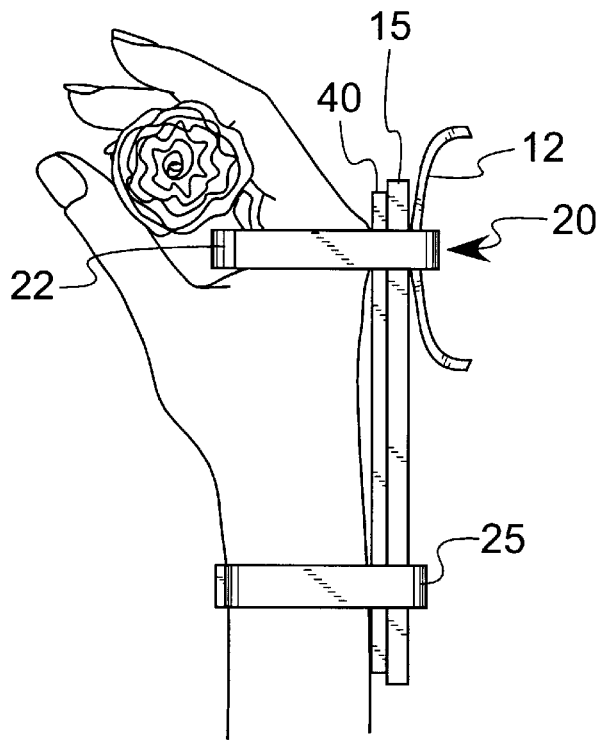
FIG. 6 is a top plan view of the present trowel assembly showing the user's hand movable within, but unable to inadvertently slip out of, the space between the handle and the brace.

As illustrated in FIGS. 5 and 6, the graspable portion 22 of the handle 20 is spaced outwardly from the brace 15 a distance sufficient to enable a user to move her hand within the hand-receiving space 30, but this distance is limited in order to prevent the user's hand from inadvertently slipping out of the handle 20. As illustrated in FIG. 5, the user can comfortably grasp the graspable portion 22 of the handle 20 in order to use the trowel. As shown in FIG. 6, the user can easily remove her grip from the graspable portion 22 and grasp other objects such as plants or soil while the trowel remains intact. The handle 20 provides stability in that the user's hand is comfortably confined to the hand receiving space 30 while the user is reaching for or grasping plants or soil. The user's forearm remains strapped to the brace 15 by the band 25 so that the trowel assembly 10 remains attached to the user. The band 25 is shown with a readily releasable closure, such as a Velcro® hook and loop assembly for holding the band 25 on the user's forearm. Other closure means for attaching the band 25 to the user's forearm may be used such as snaps, buttons, zippers, or the like. The band 25 may also be a loop of elastic or other flexible material or fabric through which a user can slide his or her hand and forearm.

Although a particular embodiment of the present invention has been described in detail, other embodiments are within the scope of this invention. Variations may be made to the described embodiment by those skilled in the art without departing from the spirit of the invention or the scope of the appended claims.

I claim:

1. A hand operated trowel assembly for mounting on a user's forearm, said trowel assembly comprising:
   a trowel blade;
   a longitudinal brace adapted to be attached to and to extend outwardly from an upper portion of the blade;
   a handle having a graspable portion disposed generally parallel to the upper portion of the blade and in laterally spaced, sideways relation to the brace; and
   a forearm-engaging band mounted directly on the brace in spaced relation to the handle.

2. The trowel assembly of claim 1, wherein the handle is attached to the upper portion of the trowel blade.

3. The trowel assembly of claim 1, wherein the handle is block O-shaped.

4. The trowel assembly of claim 3, wherein the handle further comprises an upper leg, a lower leg, and a return portion extending downwardly from said upper leg, and wherein said legs, said return portion and the graspable portion define a hand-receiving space.

5. The trowel assembly of claim 4, wherein the return portion extending downwardly from said upper leg is welded to the trowel blade.

6. The trowel assembly of claim 4, wherein the lower leg is provided with a flange and wherein said flange is welded to the trowel blade.

7. The trowel assembly of claim 1, wherein the handle is U-shaped.

8. The trowel assembly of claim 1, wherein the graspable portion is spaced outwardly from the brace a distance sufficient to enable the user's hand to move between said brace and said graspable portion, said distance being limited to prevent the user's hand from inadvertently slipping out of the handle.

9. The trowel assembly of claim 1, wherein the band is removably mountable on the user's forearm.

10. The trowel assembly of claim 1, wherein the brace is provided with a forearm-cushioning pad.

11. The trowel assembly of claim 1, wherein the brace is removably secured to the upper portion of the trowel blade.

12. The trowel assembly of claim 11, wherein the brace extends outwardly from the blade in a first direction for engagement with the user's right forearm.

13. The trowel assembly of claim 11, wherein the brace extends outwardly from the blade in a second direction for engagement with the user's left forearm.

14. The trowel assembly according to claim 1, wherein the handle is rigidly attached to the upper portion of the blade and to a mid-portion of the blade.

* * * * *